J. JOHNSON.

Wagon-Loaders.

No. 137,138. Patented March 25, 1873.

Witnesses:

Inventor:
J. Johnson
Per
Attorneys.

UNITED STATES PATENT OFFICE.

JEREMIAH JOHNSON, OF IOWA CITY, IOWA.

IMPROVEMENT IN WAGON-LOADERS.

Specification forming part of Letters Patent No. 137,138, dated March 25, 1873.

*To all whom it may concern:*

Be it known that I, JEREMIAH JOHNSON, of Iowa City, in the county of Johnson and State of Iowa, have invented a new and Improved Wagon-Loader, of which the following is a specification:

For loading wagons, carts, and trucks with earth in grading, digging canals, making embankments, and in other work where large quantities of earth are to be removed from one place to another, I propose to dispense with the laborious and inexpensive method of loading it with hand-shovels, by the use of a hoisting and dumping platform in a portable frame and with power hoisting-gear, so arranged that I can scrape the earth onto the platform by horse-scrapers, or draw it on by the scrapers and dump it; then raise the platform, drive the wagon to be loaded under it, and dump the earth from the platform into the wagon.

Figure 1:
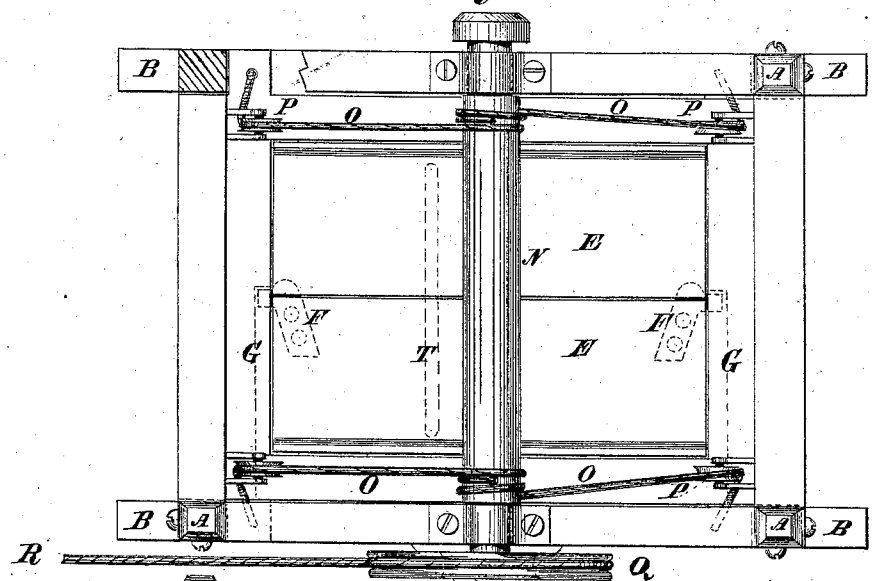
Figure 2:
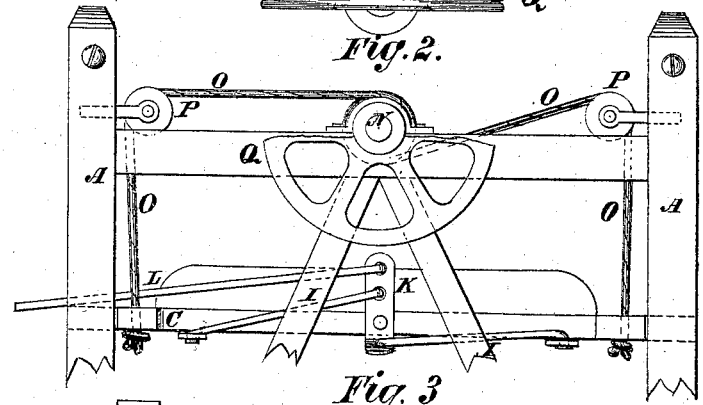
Figure 3:
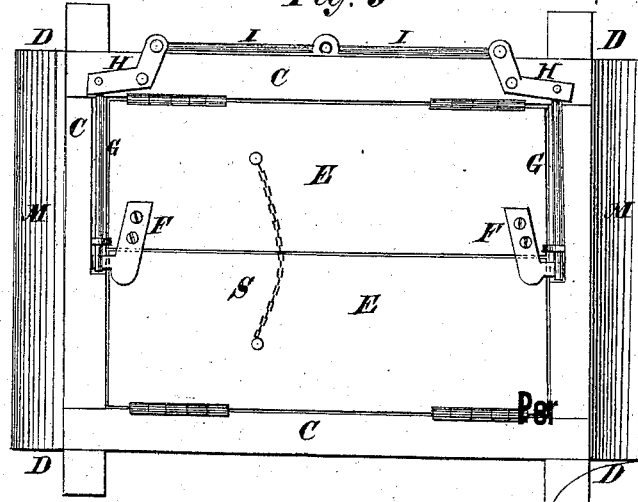

Figure 1 is a plan view of my improved machine. Fig. 2 is a partial side elevation; and Fig. 3 is a plan of the platform detached from the frame and reversed.

Similar letters of reference indicate corresponding parts.

A represents the posts of a vertical frame mounted on short runners B, whereon it can be drawn along the ground from place to place as it may require to be shifted in the progress of the work. C is a strong platform with notches D at the corners arranged to receive the corners of the posts for guides to control it in working up and down on them. The floor of this platform consists of doors E, preferably two, which are hinged so as to open downward and discharge the earth on them below. F represents catch-plates on the under sides of the doors, and G bolts on the frame of the platform for holding the doors up and for tripping them to dump the load. The bolts are connected by bell-cranks H and rods I, with a lever, K, for working them together, and a handle, L, is connected to the lever for working it. The platform is beveled on the ends at M, so that a scraper loaded with earth will ride upon it readily, and it is suspended from a roller or drum, N, by chains O passing over grooved rollers P on the corners of the top of the frame. The chains pass under the roller at one side and over it at the other, so that they will be worked alike to elevate or lower the platform. This roller has a wheel, Q, at one end, to which power is applied by a rope, R, with a horse hitched to it, or any other means to raise and lower the platform. The doors E are connected on the under side by a chain, S, which limits the opening of them so that when the platform goes down they will be closed by the edges striking on the rod T. The bolts are then pushed under the catch-bar by the lever K, and the platform is then loaded by the scrapers being drawn on it and dumped. The platform is raised and the wagon or cart to be loaded driven under it to receive the load which falls when the catch-rods G are pulled back. In this way I expect to economize the labor of loading wagons, carts, &c., considerably, as compared with loading them by hand.

Having thus described my invention, I claim as new and desire to secure by Letters Patent—

1. The loading apparatus, consisting of the portable frame, the elevating and dumping platform, and the apparatus for working said platform, arranged and adapted for loading the platform with a scraper, and for driving wagons, carts, &c., under it, and dumping the earth from it into them, substantially as specified.

2. The arrangement of the platform C, frame A, roller N, chains O, pulleys P, and driving-wheel, substantially as specified.

3. The arrangement, with the doors E and platform C, of the catch-bars F, bolts G, bell-cranks H, rods I, lever K, and handle L, substantially as specified.

4. The combination, with the doors E and a chain, S, connecting them in the manner described, of rod T on the floor of the frame, substantially as specified.

JEREMIAH JOHNSON.

Witnesses:
 CHARLES T. RANSOM,
 PRINTICE RANSOM.